(12) United States Patent
Smith et al.

(10) Patent No.: US 12,288,534 B2
(45) Date of Patent: Apr. 29, 2025

(54) BALANCING ALTERNATE FRAME TIMES ON A VARIABLE REFRESH RATE DISPLAY

(71) Applicant: Intel Corporation, Santa Clara, CA (US)

(72) Inventors: Gary K. Smith, Cambridgeshire (GB); Santosh K. Agrawal, Bangalore (IN)

(73) Assignee: Intel Corporation, Santa Clara, CA (US)

(*) Notice: Subject to any disclaimer, the term of this patent is extended or adjusted under 35 U.S.C. 154(b) by 993 days.

(21) Appl. No.: 17/114,435

(22) Filed: Dec. 7, 2020

(65) Prior Publication Data

US 2021/0193065 A1 Jun. 24, 2021

(51) Int. Cl.
*G06T 1/20* (2006.01)
*G09G 3/36* (2006.01)

(52) U.S. Cl.
CPC ............ *G09G 3/3618* (2013.01); *G06T 1/20* (2013.01); *G09G 3/3614* (2013.01); *G09G 2320/0247* (2013.01)

(58) Field of Classification Search
CPC .............. G09G 3/3618; G09G 3/3614; G09G 2320/0247; G09G 2310/0254; G09G 2320/0204; G09G 2340/0435; G09G 2340/16; G09G 3/20; G06T 1/20; G06F 3/1407; G06F 3/147; G06F 9/4451; G06F 9/451
See application file for complete search history.

(56) References Cited

U.S. PATENT DOCUMENTS

| | | | |
|---|---|---|---|
| 2012/0169691 A1* | 7/2012 | Newswanger | G09G 3/3614 345/211 |
| 2015/0194111 A1 | 7/2015 | Slavenburg et al. | |
| 2015/0243233 A1 | 8/2015 | Bloks et al. | |
| 2016/0232833 A1 | 8/2016 | Wang et al. | |
| 2017/0075432 A1 | 3/2017 | Verbeure et al. | |
| 2018/0174551 A1* | 6/2018 | Ansari | G09G 5/12 |
| 2021/0280156 A1* | 9/2021 | Mehta | G09G 5/10 |

OTHER PUBLICATIONS

EPO Extended European Search Report in EP Application Serial No. 21198052.9 mailed on Mar. 2, 2022 (11 pages).

* cited by examiner

*Primary Examiner* — Temesghen Ghebretinsae
*Assistant Examiner* — K. Kiyabu
(74) *Attorney, Agent, or Firm* — Alliance IP, LLC

(57) ABSTRACT

In one embodiment, a new frame is to be presented on a display. A frame time is predicted for the new frame along with a current balance for a set of previously presented frames. A frame pattern for the new frame is determined based on the predicted frame time and the current balance.

20 Claims, 18 Drawing Sheets

```
# This is the time of an active frame.
vmin = 7

# This is the maximum time the display can handle between active frames.
vmax = 25

# Configurable target position within the blank for the predicted flip to occur if possible. The can range
# from 0.1 to 0.8. A lower number
# will result in more actives and hence less flicker than a higher number.
blank = 0.5

# Configurable guardbands for starting to apply corrections. The ideal minimum guardband is typically
# about 1.5x vmin. Values below this can
# be used, but the tend to add more frame latency
guardband = vmin * 1.5

# Configurable amount of adjustment to apply when the balance is at twice the guardband.
guardband_slope = 4.0 / guardband

# Enable balancing or just leave as natural vmin/vmax
enable_balancing = 1 this is used during adjustments to ensure that we should always have a small bit of blank (5%) after an
active whenever we split a frame into two.
# This is to ensure that we don't force an artificial FPS limit where the final active blocks the GPU
# from running faster and hence our prediction gets stuck.
vminfinal = vmin + 0.05 * (vmax - vmin);

# Convert blank proportion to number of milliseconds.
blank_ms = blank * (vmax - vmin)
```

```
#calculate how to adjust the final to alter the balance
if modified_balance < 0 :
    # negative
    if num_frames % 2 == 1 :
        final = final + adjust
    else :
        final = final - adjust
else :
    # positive
    if num_frames % 2 == 1 :
        final = final - adjust
    else :
        final = final + adjust

# Ensure that final remains between acceptable limits
final = min(max(final, vminfinal), vmax)

if num_frames == 1 :
    # single frames cases need some adjustments as there is no capability to adjust the middle frame
    if modified_balance < -guardband :
        # single frame and negative guardband frames need to be extended to create convergence.
        initial_flipline = final
    else :
        # Cannot shorten a single frame case.
        final = max(final, predicted)
```

FIG. 9C

```
#calculate the desired time of any earlier frames
if num_frames > 1 :
    earlier_vtotal = max((predicted - final) / (num_frames - 1), vmin)
else:
    earlier_vtotal = 0 if modified_balance > guardband:
    # limit the vtot max to increase convergence
    final_vtotal = min(max(earlier_vtotal,final) + vmaxadj), vmax)

return num_frames, earlier_vtotal, final, initial_flipline, final_vtotal
```

FIG. 9D

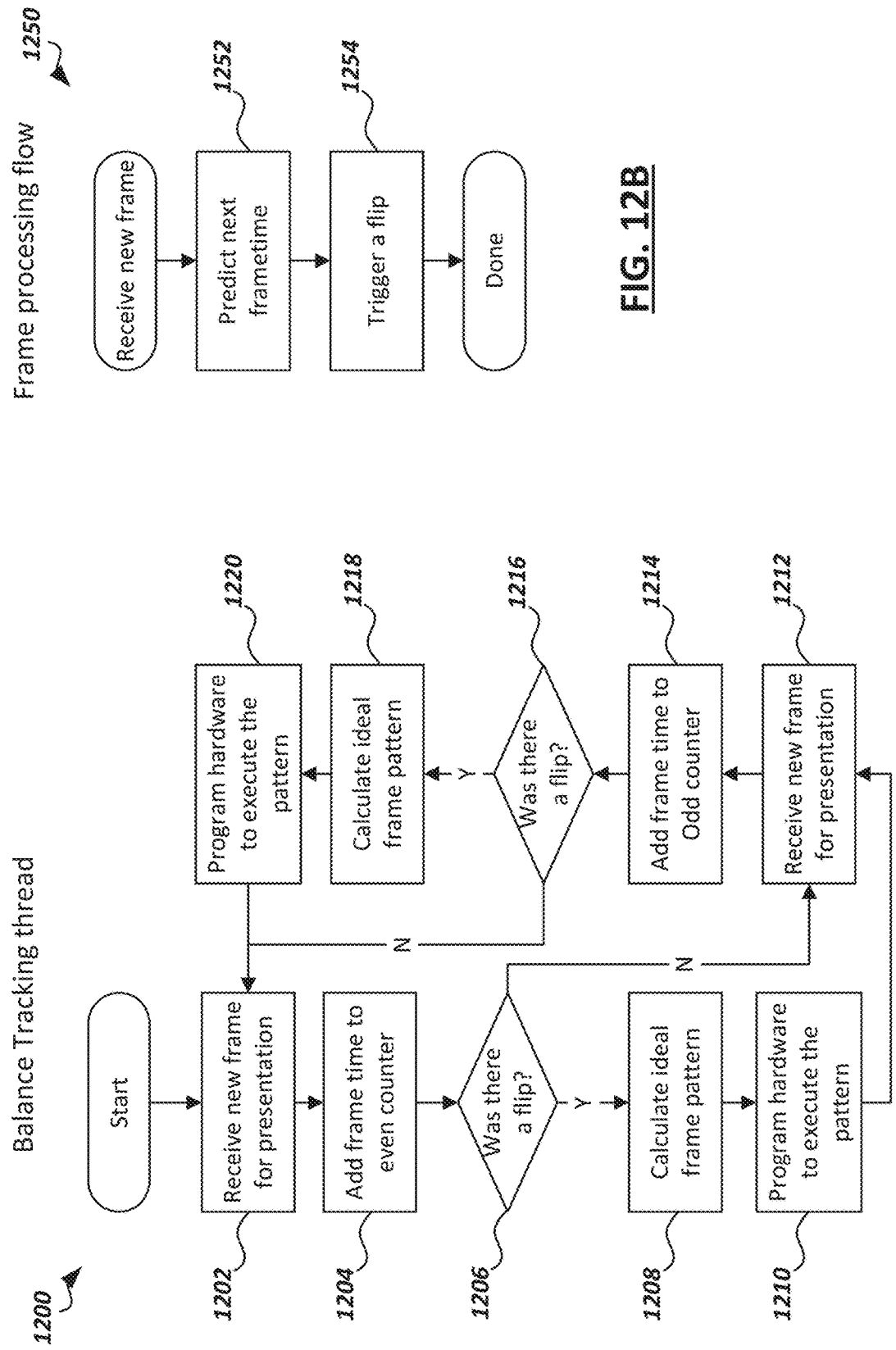

BALANCING ALTERNATE FRAME TIMES ON A VARIABLE REFRESH RATE DISPLAY

TECHNICAL FIELD

This disclosure relates in general to the field of computer systems and, more particularly, to balancing alternate frame times on a variable refresh rate display.

BACKGROUND

Variable refresh rate (VRR)-capable displays can build-up a charge over time, resulting in screen flicker to the user. Display technology charges positively on one frame and negatively on the successive frame to ensure a net zero charge over time. However, when alternate frames are delivered persistently with differing frame times in VRR, the charge can drift from a net zero position, causing a visible flicker on the screen.

BRIEF DESCRIPTION OF THE DRAWINGS

FIGS. 9A-9D illustrate pseudocode for implementing an example balance tracking and correction algorithm in accordance with embodiments of the present disclosure.

FIGS. 12A-12B are flow diagrams of additional example processes for tracking an overall charge balance and processing frames in accordance with embodiments of the present disclosure.

Like reference numbers and designations in the various drawings indicate like elements.

DETAILED DESCRIPTION OF EXAMPLE EMBODIMENTS

In the following description, numerous specific details are set forth, such as examples of specific configurations, structures, architectural details, etc. in order to provide a thorough understanding of the present disclosure. It will be apparent, however, to one skilled in the art that these specific details need not be employed to practice embodiments of the present disclosure. In some instances, well known components or methods may be utilized, and such details haven't been described in detail in order to avoid unnecessarily obscuring embodiments of the present disclosure.

Figure 1:
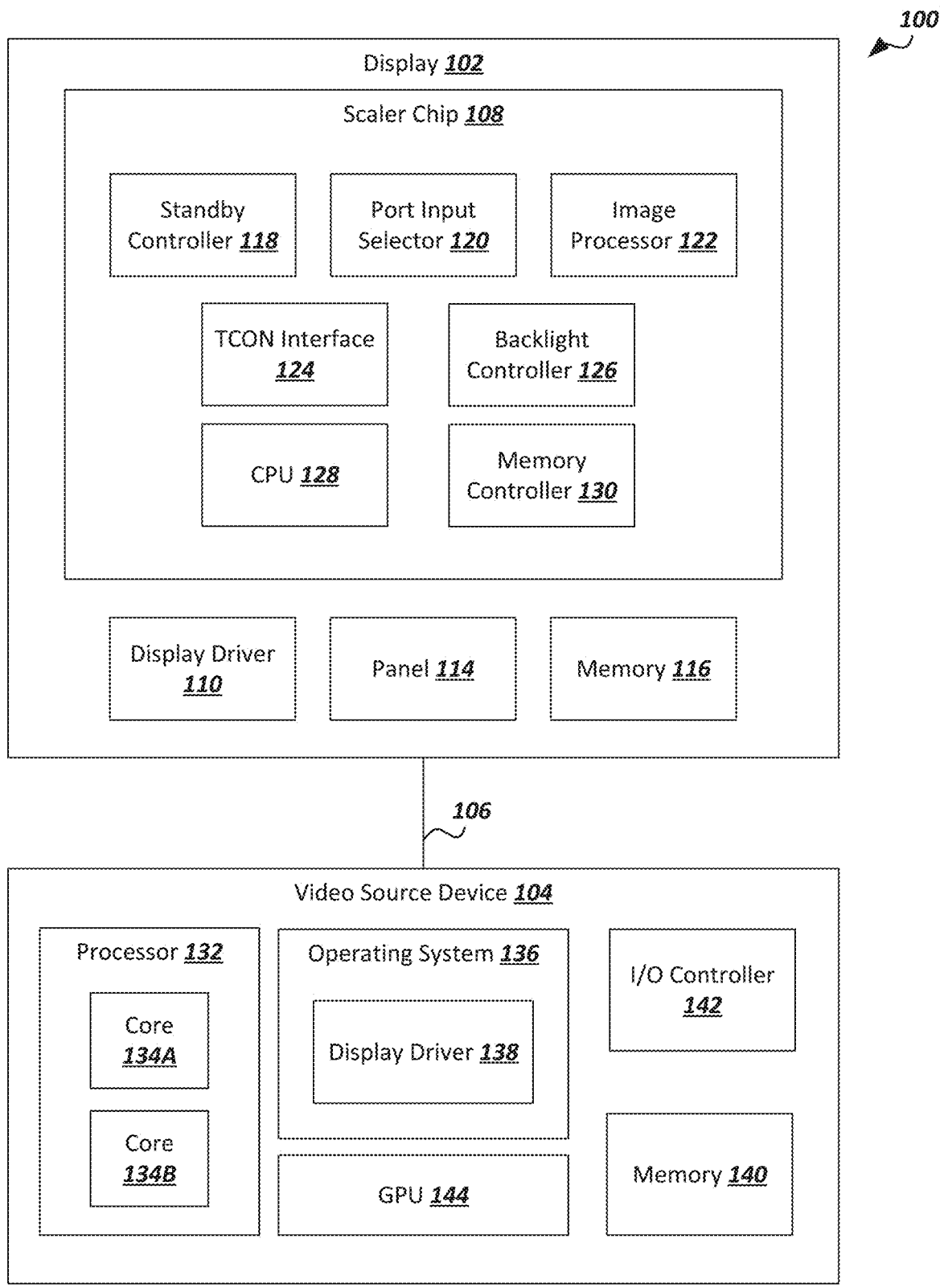
FIG. 1 illustrates a block diagram of an example computing system 100 in accordance with certain embodiments.

FIG. 1 illustrates a block diagram of an example computing system 100 in accordance with certain embodiments. The example computing system 100 comprises a display 102 coupled to a video source device 104 (also referred to herein as a "display source" or "source") via a link 106. In the example shown, the display 102 is coupled to a video source device 104 to display a representation of a video signal received from the video source device 104. The display 102 comprises a scaler chip 108, a display driver 110, a panel 114, and a memory 116. Some embodiments may include a display with any suitable combination of components (including any of those shown or other components). Scaler chip 108 includes standby controller 118, port input selector 120, image processor 122, timing controller (TCON) interface 124, backlight controller 126, central processing unit (CPU) 128, and memory controller 130.

Standby controller 118 is operable to manage operations associated with entry into standby and exit from standby for the display 102. For example, the standby controller 118 may coordinate the fast scan procedure described herein, the context save and restore procedure, or the entry into and exit from standby for the display 102. In various embodiments, standby controller 118 may coordinate with other components of display 102 to achieve the functions described herein. In some embodiments, all or a portion of standby controller 118 may be integrated within another component of the scaler chip 108, such as the port input selector 120 or CPU 128; or other component of the display 102. Thus, in some embodiments the standby controller 118 may be a distinct logic component or may include a collection of logic from various components of the scaler chip 108 (or other components of the display 102).

Port input selector 120 is operable to select a port from among a plurality of ports of the display 102 and to pass a video signal received through the port to a processing pipeline of the display 102. The port input selector 120 may include a port interface that comprises or is coupled to a plurality of ports of the display. The display 102 may include any number of ports of any type. For example, display 102 may include a DisplayPort™ port, a High-Definition Multimedia Interface (HDMI™) port, a Universal Serial Bus (USB) port, a Digital Visual Interface (DVI) port, a Video Graphics Array (VGA) port, or other suitable port. Display 102 may include any suitable combination of ports, including multiple ports of the same type or multiple ports of different types. The port input selector 120 may include selection logic coupled to the port interface to select a particular port and to pass the signal received through the particular port on to additional logic (e.g., the standby controller 118, the image processor 122, etc.). In some embodiments, the port input selector 120 may also include conversion logic to receive a signal from any of the ports of the display 102 and convert the signal to a common format (e.g., a digital pixel format) for further processing.

Image processor 122 may receive a video signal from the port input selector 120 and perform further processing on the video signal. In some embodiments, the image processor 122 may execute one or more algorithms to improve the image quality of the video signal. For example, image processor 122 may perform resolution upscaling, contrast adjustment, color adjustment, or other suitable image processing. In some embodiments, image processor 122 may superimpose one or more images (e.g., a user menu of the display 102) on the video signal.

TCON interface 124 may receive a processed signal from image processor 122 and convert the signal to a format (e.g., a serial high speed interface format such as Embedded DisplayPort™ (eDP) or V-by-One®) compatible with a TCON of the display driver 110.

Backlight controller 126 may include a backlight driver and may generate signals that may be used by the backlight driver to produce current to light up the panel 114.

CPU 128 may provide various functions of the display 102. For example, the CPU 128 may manage the on-screen display and user configuration adjustments of the display 102. The CPU 128 may communicate with other components of the display 102 (e.g., to bring up a menu or change the brightness of the display in response to a user selection).

Memory controller 130 may control the transfer of data between one or more components of the scaler chip 108 and the memory 116. Memory 116 may include any suitable volatile or non-volatile memory to support the operations of the display 102. For example, the memory 116 may be used to store instructions executed by the components (e.g., CPU 128, standby controller 118, image processor 122, or other component), frame data (e.g., values of pixels), on-screen display data, or other suitable data. In some embodiments, memory 116 may comprise multiple different memory modules (e.g., each of which may be dedicated to particular types of data) located on any one or more components of the display 102. For example, in various embodiments, the scaler chip 108 may include one or more memory modules to support the operation of the scaler chip 108.

Display driver 110 may comprise circuitry to receive a video signal and to drive electrical signals to the display elements of the panel 114 to cause the panel 114 to display the video. In a particular embodiment, display driver may comprise a TCON. In a particular embodiment, display driver 110 comprises one or more row and column drivers to drive the display elements. The display driver 110 may include one or more digital to analog converters (DACs) to produce the appropriate currents to drive the display elements.

In various embodiments, panel 114 may generate light or allow for the transmission of light in a plurality of pixels. Panel 114 may comprise a display substrate on which a plurality of pixels are located. The pixels define a display area within which a video signal comprising still images, videos, or other content defined by a video signal can be displayed. Panel 114 may utilize any suitable display technology, such as, e.g., a thin-film-transistor liquid crystal display (TFT LCD), micro-light emitting diode (micro-LED), organic LED (OLED), quantum dot LED (QLED), or other suitable display technology.

The components of the display 102 may be arranged in any suitable manner. In one embodiment, a first printed circuit board may comprise the scaler chip 108 and a second printed circuit board may comprise the display driver 110 (in some embodiments a separate printed circuit board may house the TCON). In some embodiments, memory 116 or a portion thereof may be included on the first printed circuit board (or integrated on the scaler chip 108).

Video source device 104 may be any suitable computing device to communicate a video signal to the display 102. For example, video source device 104 may be a desktop computing system, a laptop computing system, a server computing system, a storage system, a handheld device, a tablet, or other suitable computing device.

In the embodiment depicted, video source device 104 comprises processor 132, operating system 136 (which may be executed by processor 132), memory 140, I/O controller 142, and graphics processing unit (GPU) 144. Processor 132 is depicted as including two processing cores 134A and 134B, though the processor 132 may include any suitable number of cores.

The operating system 136 may execute a display driver 138 that controls the connection from the video source device 104 over the link 106 to the display 102 and the communication of the video signal (and supporting communications) over the connection. The display driver 138 may be implemented as software, e.g., as a computer program, with instructions to control the GPU 144. Based on information or commands from the display driver 138, the GPU 144 may generate video signals that are communicated to the display 102. In the embodiment depicted, the GPU 144 is a discrete component, though in other embodiments, the GPU 144 may be integrated with processor 132.

Memory 140 may include any suitable volatile or non-volatile memory to support the operations of the display 102. The memory 140 may be used to store instructions (e.g., display driver 138) executed by the components (e.g., processor 132 or GPU 144), or other suitable data. In some embodiments, memory 140 may comprise multiple different memory modules (e.g., each of which may be dedicated to particular types of data) located on any one or more components of the display video source device 104. In some embodiments, memory 140 may comprise a system memory.

Link 106 may comprise any suitable transmission medium operable to communicate analog or digital data between the display 102 and the video source device 104. In some embodiments, link 106 may comprise a cable with a connector on each end. For example, link 106 may comprise a DisplayPort™ cable, an HDMI™ cable, a USB cable, a DVI cable, a VGA cable, or other suitable cable.

In embodiments of the present disclosure, the display 102 is able to display video at a variable refresh rate (VRR). The refresh rate of the display may refer to the number of frames per unit time (e.g., seconds) that a display displays a new image to a user. Whereas some displays have static refresh rates, VRR-capable displays may display images as they are provided by the video source device, providing a refresh rate that varies.

To avoid charge build-up in electrical components of the display, sequences of images may be presented using voltages of alternating polarity. That is, components of the display may be charged positively on one frame and negatively on a successive frame to ensure a net zero charge over time. However, when alternate frames are delivered persistently with differing frame times, the charge can drift from a net zero position, causing a visible flicker on the screen. Due to this, VRR-capable displays can build-up a charge over time when displaying images in a VRR mode, resulting in screen flicker to the user.

Figure 2A:
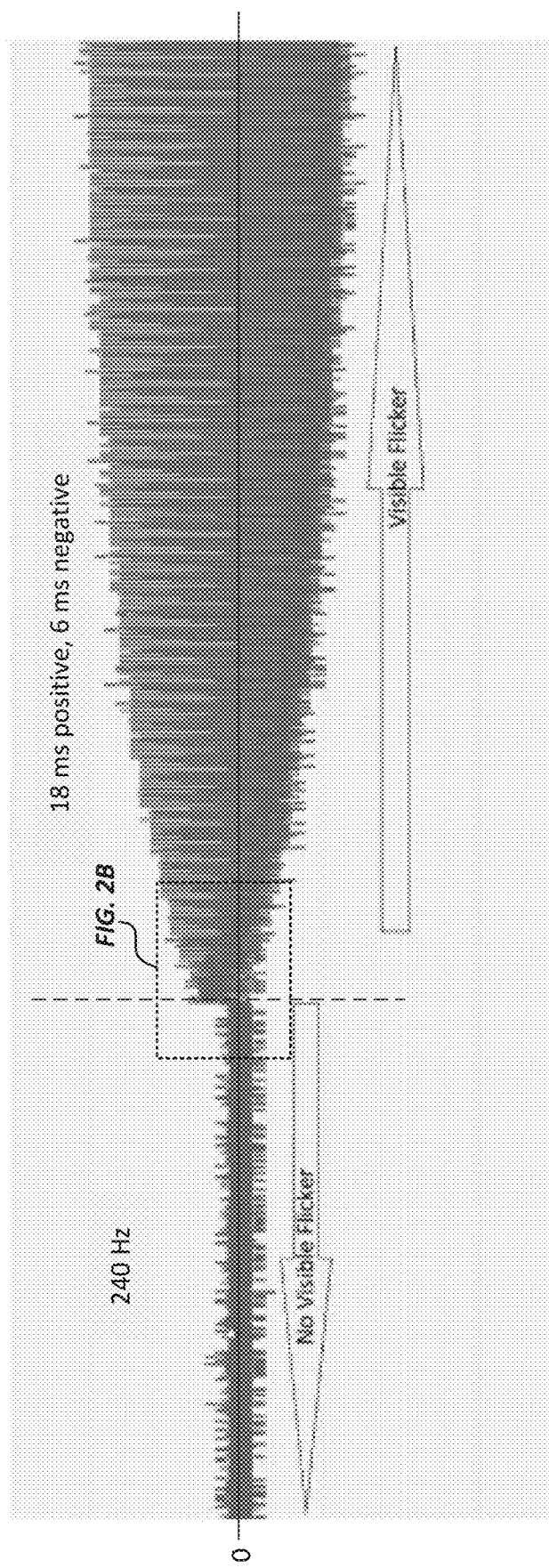
FIGS. 2A-2B illustrate example charts showing charge build-up in a variable refresh rate (VRR) scenario.
Figure 2B:
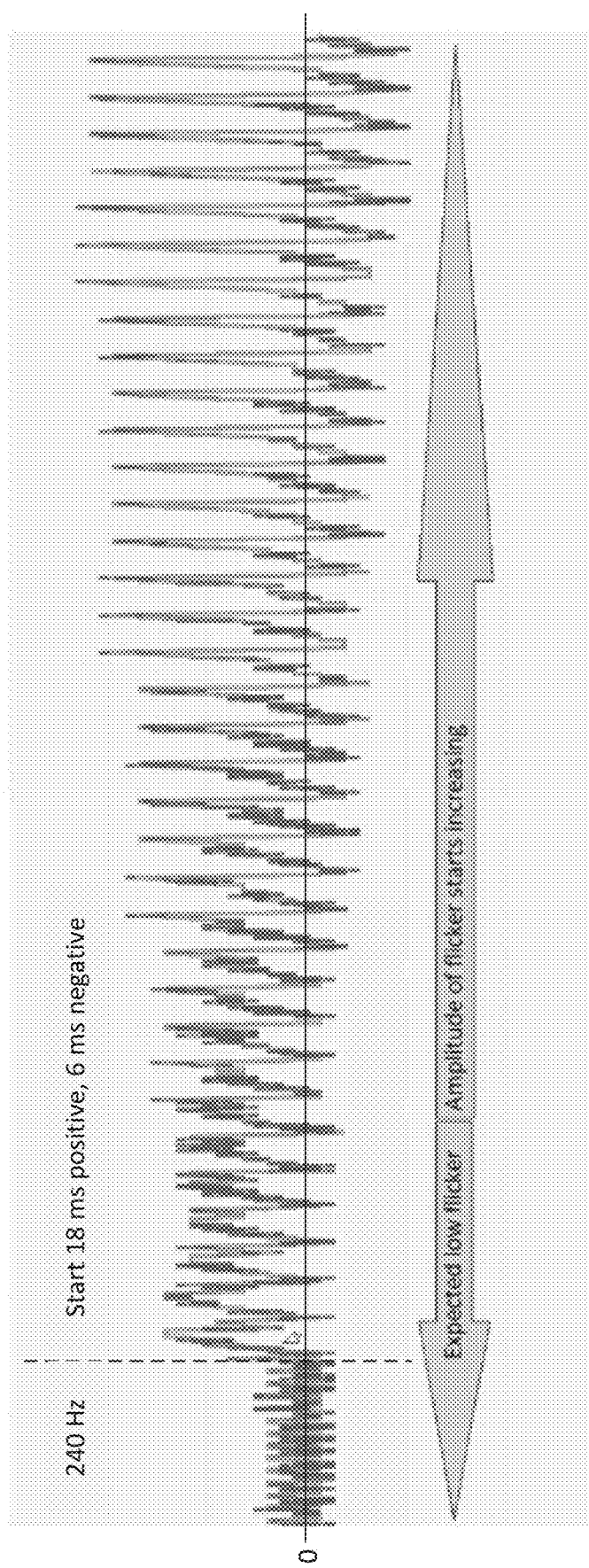

FIGS. 2A-2B illustrate example charts showing charge build-up in a variable refresh rate (VRR) scenario. In particular, the left side of the charts (relative to the dotted vertical line) illustrate the charge build-up that occurs in a static 240 Hz refresh rate scenario, while the right side of the charts illustrate the charge build-up that occurs in a VRR scenario that includes displaying an image for 18 ms via a positive voltage and a subsequent image for 6 ms via a negative voltage. As shown, because of the mismatch in timing of the alternating positive and negative voltages, charge builds up over time in the VRR scenario whereas charge remains relatively neutral in the static refresh rate scenario. After some time in the VRR scenario, the charge build-up causes visible flicker to a user of the device.

Previous solutions to this problem having included forcing all odd frames to have the same frame time as even frames to ensure that the balance is maintained. However, as the frame time of the second frame of the pair is unknown at the decision point, an additional delay in getting that second frame to the screen will be common, often a very large delay (of perhaps a whole frame). Another previous solution has been to operate a fixed rate for a period of time, and change the fixed rate when the average incoming rate changes. This approach suffers from many of the stuttering issues of fixed refresh rate displays, however. Another previous solution has been to limit the rate of change of a frame. However, while this can reduce the problem, it does not fix it, and flicker can still occur in some situations.

Embodiments of the present disclosure may include one or more mechanisms that can be implemented by one or more components of a computer system (e.g., by a display driver such as display driver 138) to minimize the flicker caused by the charge build-up issue in variable refresh rate displays. For instance, embodiments may control the amount of flicker sufficiently so that it is not visible to the end user. This may be done, in certain embodiments, by tracking the total time spent displaying positive/odd and negative/even frames sent to the display and predicting the next incoming frame time. When the frame timing permits, an extra frame may be inserted at an appropriate time to reduce the delta in frame time. When the frame timing does not permit, the frame time of the lower frame count may be extended to make the two totals converge. This may eliminate visible flicker from occurring under some conditions while running VRR protocols such as Adaptive Sync (e.g., VESA Adaptive-Sync) or High-Definition Multimedia Interface (HDMI) variable refresh rate (VRR).

The display driver (e.g., driver 138 of FIG. 1) or display engine (e.g., a hardware controller/engine of GPU 144 of FIG. 1) has no direct way to measure the current charge balance on the display. However, as the display driver is issuing the new frames (sometimes referred to herein as "flips") that cause the switch from positive charge signals to negative charge signals, the driver can use the execution time of each frame as an indication of the amount of charge being built up by that frame. For instance, in certain embodiments, the driver can implement an algorithm that tries to ensure that the total time spent in odd frames is very close to the total of time spent in even frames over a particular time period. The electronics in the monitor itself will have some non-linear response to charge build-up and some charge decay over time. These factors make the display itself slightly less susceptible to flicker than alternate frame times would indicate. However, by tracking the total alternate times and keeping them within appropriate limits, the driver might not need to understand any of the detail of how the underlying display component technology functions.

Thus, embodiments of the present disclosure may provide a display device-agnostic solution to flicker that may result from charge build-up caused by varying refresh rates. For example, in particular embodiments, a display driver may calculate or otherwise determine a current balance that is indicative of a potential charge build-up in electrical components. The current balance may be referred to as a polarity balance (with polarity referring to the odd/even or positive/negative alternation of frames being presented), and may be based on a number and length of frame "flips" (e.g., from positive to negative). The display driver may also predict a next frame time, i.e., when it expects the next frame to arrive for presentation. Based on the determined balance and predicted frame time, the display driver may determine how to drive the display in such a way that a achieves an overall, long term balance. For example, the display driver may issue one or more positive/negative flips in the duration of presenting a frame such that the current balance is shifted toward zero (e.g., the flips are executed to increase or decrease the balance) or is maintained (e.g., the flips are executed to maintain a zero balance). In this way, the balance tracking algorithm implemented by the display driver may allow for flicker-free frame presentation on any display, without the need for display-dependent solutions.

In the following examples, a 144 Hz-40 Hz adaptive sync-capable display and a 34 ms game frame time are assumed. This allows the behavior to be shown clearly. However, it will be understood, that any other suitable refresh rate range and frame time can be handled by embodiments of the present disclosure. Displays that are compatible with Adaptive Sync protocols may display frames that include an "active time" and a "blanking time", which together form the "total time" of the frame. In certain embodiments, charge build-up prevention may be more optimally achieved when the total time is at least twice the active time. The active time may refer to pixel clocks when a display is being sent new pixels for a new frame, while blank or blanking time may refer to a number of extra scanlines of blank/black that are sent between each frame.

Figure 3:
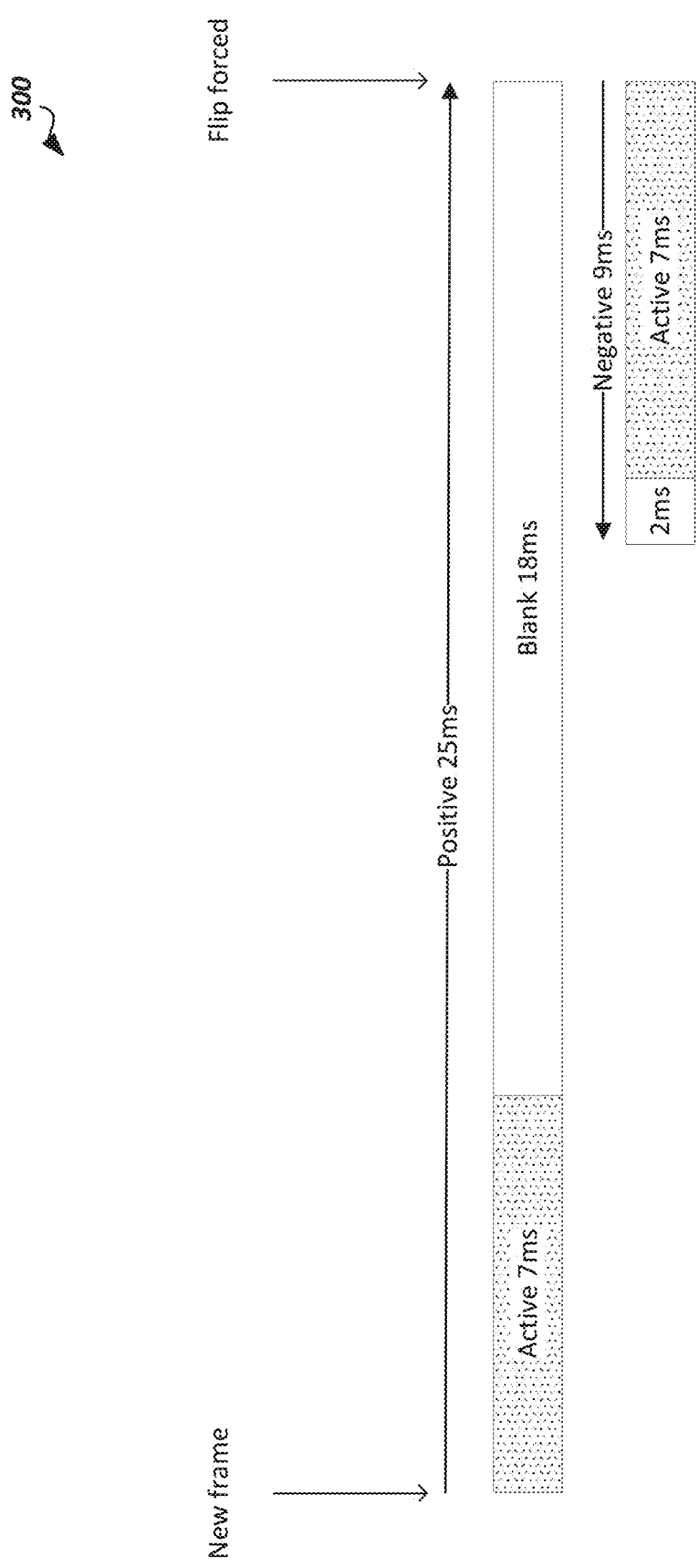
FIG. 3 illustrates an example variable refresh rate (VRR) scenario in which a balance is not monitored by a display driver in accordance with embodiments of the present disclosure.

FIG. 3 illustrates an example variable refresh rate (VRR) scenario 300 in which a balance is not monitored by a display driver in accordance with embodiments of the present disclosure. In particular, the example scenario illustrates an example scenario involving a 34 ms frame that is to be displayed on an adaptive sync-compatible display. If the display driver takes no proactive action (e.g., as described herein), the Adaptive Sync specification will force the display engine to deliver a flip after 25 ms to maintain a 40 Hz minimum refresh rate. As will be seen from FIG. 3, the 34 ms frame time will result in an overall positive balance of 14 ms, based on the 25 ms positive balance followed by the 9 ms negative balance from the forced flip. If this pattern is repeated, the balance will rapidly shift in the positive direction at 14 ms per frame.

In the examples described herein, each flip within a frame will cause the display to present the same frame, but via a voltage of an opposite polarity. Referring to the example shown in FIG. 3, for instance, the display may present a frame by driving the display components with a positive voltage for 25 ms, and then present the same frame by driving the display components with a negative voltage for the remaining 9 ms. Further, as will be seen from the examples described, each flip may contain an active segment and a blank segment. In some instances, the length of the active segment for each flip may be defined by a protocol or specification (e.g., 7 ms active segments for Adaptive Sync specifications). In some instances, the percentage of blank time may be configured, as described further below.

Figure 4:
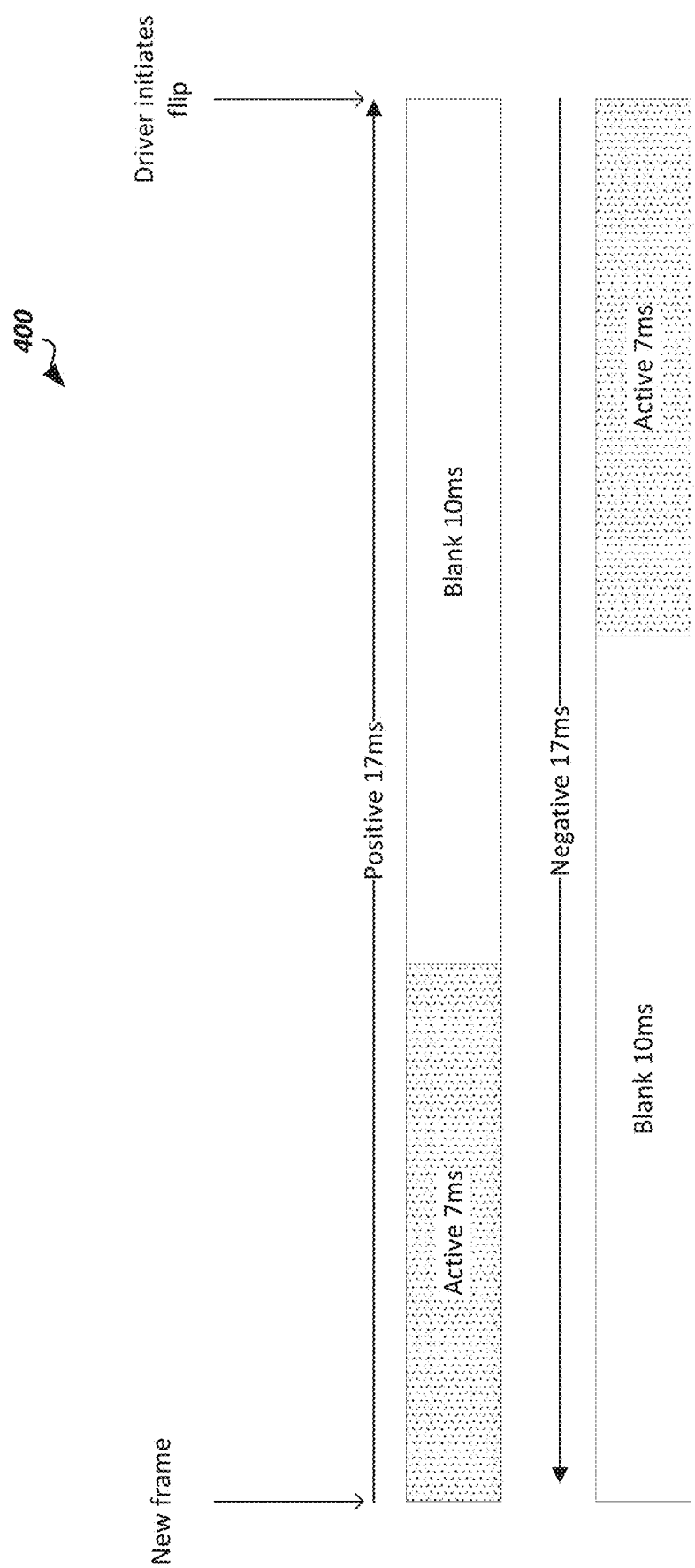
FIG. 4 illustrates an example VRR scenario in which a balance is monitored by a display driver in accordance with embodiments of the present disclosure.

FIG. 4 illustrates an example VRR scenario 400 in which a balance is monitored by a display driver in accordance with embodiments of the present disclosure. In particular, the example scenario illustrates the same 34 ms frame involved in the scenario 300 of FIG. 3. However, in the example scenario 400, the display driver instead initiates the flip/second active to be delivered earlier than the 25 ms mark (at the 17 ms mark in the example shown). In this way, the display can keep displaying 34 ms frames while maintaining an overall balance at or near zero, preventing visual flicker from occurring.

FIGS. 5A-5B illustrate other example VRR scenarios 510, 520 (respectively) in which a balance is monitored by a display driver in accordance with embodiments of the present disclosure. In the examples shown, rather than initiating a single flip in the frame as in FIG. 4, the display driver initiates additional flips. In particular, in the example scenario 510, the display driver divides the 34 ms frame time into 3 segments, and initiates a flip at the 11.3 ms mark (vs. the 17 ms mark as in scenario 400 of FIG. 4) and another flip at the 22.6 ms mark. In the example scenario 520, the display driver divides the 34 ms frame time into 4 segments, and initiates a flip at the 8.5 ms mark (vs. the 17 ms mark as in scenario 400 of FIG. 4), another flip at the 17 ms mark, and another flip at the 25.5 ms mark.

Although certain flip patterns are shown in the examples above, any suitable number of flips may be determined and initiated by the display driver. In each instance though, the overall balance over time may remain at or near zero.

While the above examples show that it is possible to prevent balance increases, and thus, charge build-up, in each example, the display driver knows when the next frame will be displayed (i.e., every 34 ms). In most scenarios, however, the frame rate may vary by a small amount from one frame to the next. Over the course of the game, the frame rate may vary significantly, e.g., based on the current scene in a game or based on other factors. There may also be unexpected spikes in the frame rate. Therefore, in certain embodiments, a prediction algorithm may be implemented to determine how to split each frame to maintain the balance. In any event, the balance correction algorithm may be resilient to any misprediction, whether due to frame drift, unexpected spikes in frame time, or another reason.

Figure 6:
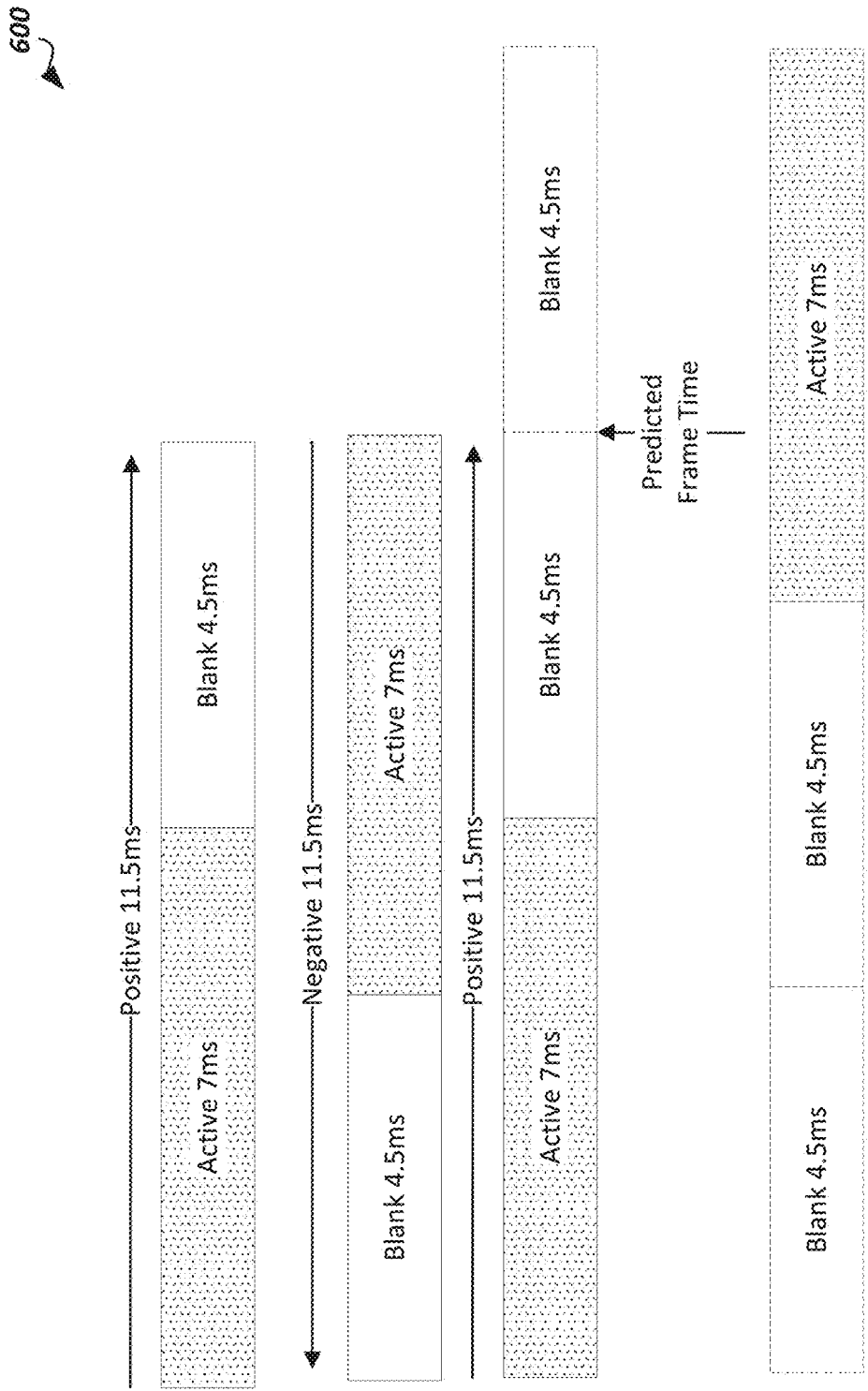
FIG. 6 illustrates an example VRR scenario in which a next frame time is predicted in accordance with embodiments of the present disclosure.

FIG. 6 illustrates an example VRR scenario 600 in which a frame time is predicted in accordance with embodiments of the present disclosure. In the example shown, the display driver has predicted that a next frame will arrive at the end of a predicted 34 ms for the current frame. As shown, there is a 9 ms window of blanking centered on the predicted frame time.

If the indicated prediction is correct, then the balance will remain as it is (and at/near zero long term if the pattern continues). However, if a new frame actually occurs up to 4.5 ms earlier or later, it can be displayed immediately, but the balance may shift accordingly (by up to 4.5 ms). If the frame is more than 4.5 ms early or late, then it may either hit a current active and be delayed until the end of an active, or it may hit a subsequent blank and be displayed immediate. In either case, it will likely shift the balance up by some amount. In the worst-case scenario (i.e., the new frame actually occurs during a current active), it will introduce a 9 ms positive balance shift.

In certain embodiments, the display driver may allow for 18 ms of blanking after the final active instead of just 9 ms. However, this may lead to a worst-case balance shift on a misprediction being 18 ms, which will make the charge build-up occur faster in extreme cases where multiple mispredictions occur. Therefore, in certain embodiments, the total possible blank time may be limited by a particular amount.

Whenever there is a misprediction, the balance will increase and there may be some level of charge build-up. Small mispredictions will generate a small misbalance as described above, and these small instances of charge misbalance can add up over time, requiring some correction to avoid flicker. Larger mispredictions will generate much larger changes and may need a more aggressive action to bring the build-up back into balance to avoid flicker. Accordingly, in some embodiments, the display driver may generate some frames that are individually out of balance so that the overall balance moves back towards being equal/zero.

Figures 7A, 7B:
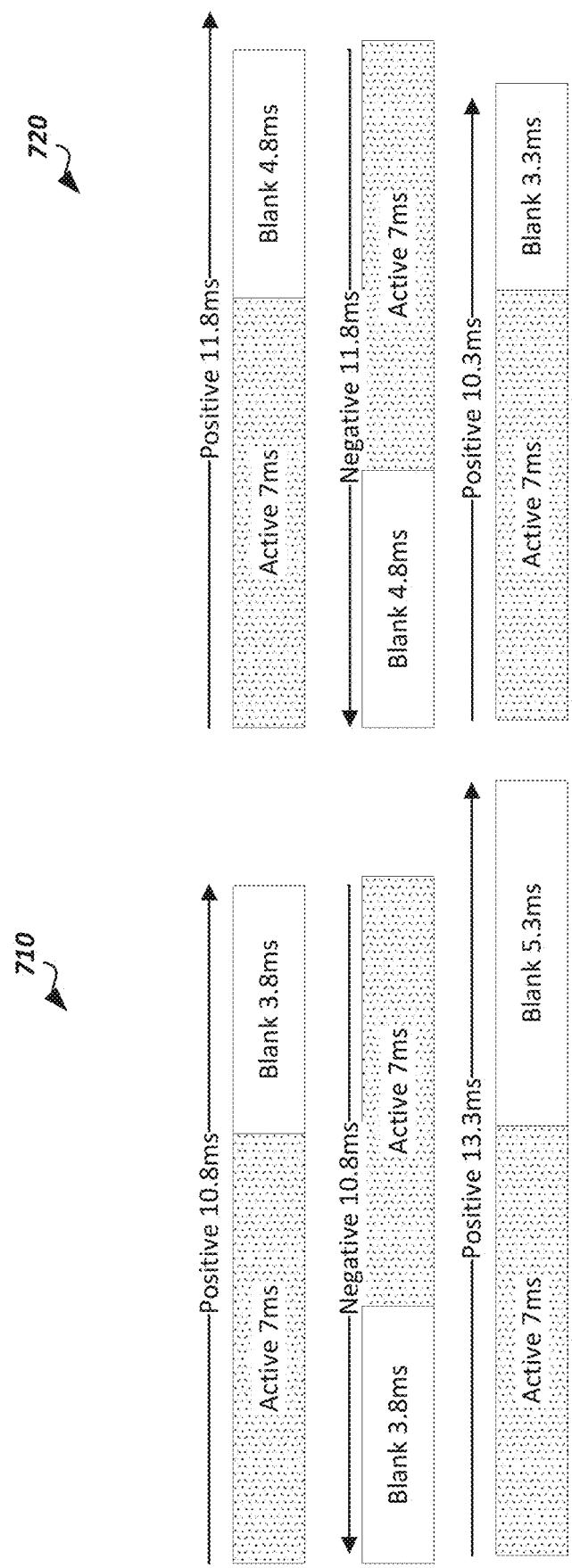
FIGS. 7A-7B illustrate example VRR scenarios in which a display driver initiates unbalanced frames in accordance with embodiments of the present disclosure.

FIGS. 7A-7B illustrate example VRR scenarios (710 and 720, respectively) in which a display driver initiates unbalanced frames in accordance with embodiments of the present disclosure. In the example shown in FIG. 7A, the balance for the 34 ms frame remains slightly positive (which may be referred to as a having a positive bias), while in the example shown in FIG. 7B, the balance for the 34 ms frame remains slightly negative (which may be referred to as a having a negative bias). In particular embodiments, the display driver can choose to apply either a positively biased frame (e.g., scenario 710) or a negatively biased frame (e.g., scenario 720) based on a current balance. For instance, if a current overall balance is negative, the display driver may choose to apply a scenario similar to scenario 710. Conversely, if a current overall balance is positive, the display driver may choose to apply a scenario similar to scenario 720.

Although the frames shown have particular balance biases, the display driver may generate frames with different balances than those shown. The balance of the generated frame may be dependent on the overall charge build-up balance. For example, a generated frame may have a higher bias (either positive or negative) where there is a relatively high current charge build-up balance, and a constructed frame may have a lower bias (either positive or negative) where there is a relatively low current charge build-up balance.

In certain embodiments, any amount of time added to the final frame blank time may be divided between the other frames and subtracted from their blanking time. Therefore, as seen in FIGS. 7A and 7B, the final frame time may be either longer or shorter than the earlier frames, respectively. With a broadly accurate prediction, error built up in the charge balance can be adjusted back to neutral over a number of frames.

In the examples described above, the balance correction is achieved by splitting a frame such that it has two or more flips (and thus, actives), with some level of variable blanking time to adjust the frames (e.g., when the frame time is at least 2.1 times the active time). However, if an incoming frame time is faster than two actives (e.g., less than 14 ms), a different mechanism may be used to correct an imbalance. In such scenarios, the display driver may ensure that any frame bringing the balance back towards equal/zero is presented onscreen for longer than any frame taking the balance further away from zero.

Figure 8:
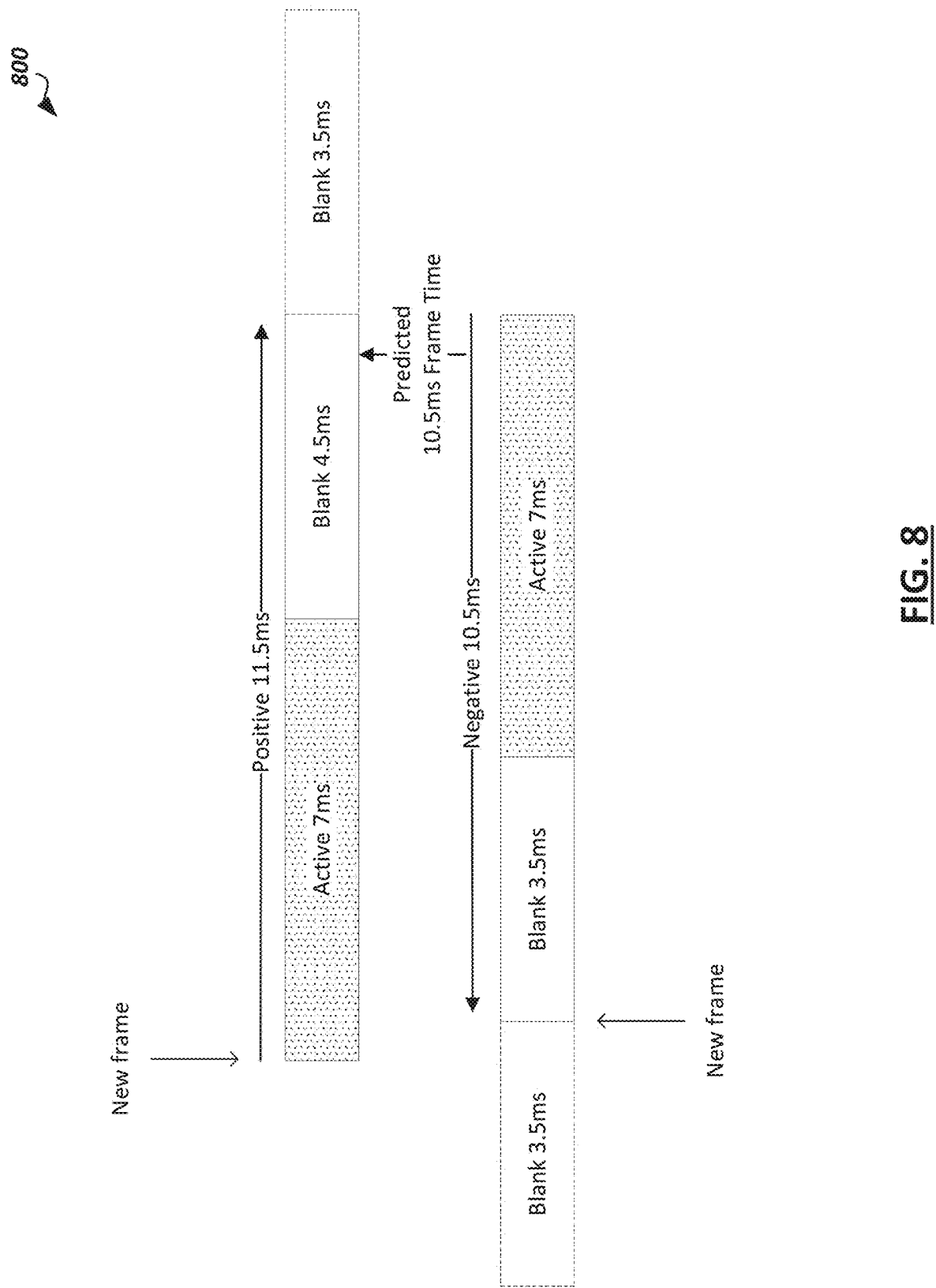
FIG. 8 illustrates an example high frame rate VRR scenario in which a display driver defers a new frame in accordance with embodiments of the present disclosure.

FIG. 8 illustrates an example high frame rate VRR scenario 800 in which a display driver defers a new frame in accordance with embodiments of the present disclosure. In the example shown, the same example 144-40 Hz VRR-capable display is considered as in the examples above. If the frames prior to those shown in FIG. 8 resulted in an overall negative charge balance, and a 10.5 ms frame time was predicted (as shown), the display driver may do the following. If a positive flip/frame is currently being displayed, the predicted frame time may be extended by a small amount (e.g., 1 ms) and any flip to a negative frame that arrives earlier than this extended time will be deferred until the end of the extended time. Any new frame that arrives later than the predicted time can be flipped and presented immediately, unless a new active has already started (e.g., if a flip is needed to meet a minimum refresh rate). This may allow for the overall negative charge balance to move toward zero. Conversely, if a negative frame is currently being displayed, the driver may allow a flip to a positive frame to happen immediately, whether its early or late relative to the predicted frame time. This may prevent further overall negative balance build-up. The opposite of the above techniques can be applied above when starting with a positive overall balance.

In certain embodiments, there may also be an option of reducing the blank time allowed after the predicted time. Adding a new active at the predicted time or shortly thereafter may allow for rapid rebalancing of the overall charge build-up, but it can also introduce additional latency to getting a new frame on the display.

To track a current overall balance, the display driver may track an execution time for each frame either in periods of time (e.g., milliseconds) or in numbers of scanlines (since every scanline has a fixed execution time, it can therefore be used as a time unit). The tracking may be implemented as either: (1) one or more counters (e.g., odd and even, or positive and negative counters), or (2) a total balance and a direction of travel for the next frame. While the examples below utilize the latter tracking technique involving a balance and direction, it will be understood that either mechanism may be used (e.g., a simple subtraction may allow movement between the two techniques).

FIGS. 9A-9D illustrate pseudocode 900 for implementing an example balance tracking and correction algorithm in accordance with embodiments of the present disclosure. Various aspects of the pseudocode 900 are described below.

Next Frame Prediction

As shown above, in certain embodiments, the driver may predict when the next frame will occur to determine what pattern of flips to execute so that that the balance remains as close to zero as possible. As one example, a simple weighted moving average may be used, such as:

$$\text{Predicted time}=(\text{Last frame predicted time}+\text{last frame actual time})/2$$

Various other techniques may be used for predicting a next frame time as well. However, the above frame prediction technique has been observed to perform consistently well on a number of frame traces (e.g., performed using video games). However, as stated previously, there may be spikes where the frame is much later than expected for a number of reasons. The correction algorithm used may be tolerant of small differences between the predicted and actual frame times and may be able to recover from any of these frame time spikes (whether positive or negative). The prediction technique above may be more reactive to rapidly changing frame times than other algorithms, making it a good choice in instances where spikes are expected.

Balance Correction—Number of Frames

A first parameter of a balance correction algorithm may include the number of active frame segments to use in each frame. With Adaptive Sync technologies, the active frame segment time is fixed—only the blanking segment time is variable. In certain embodiments, a percentage of desired blanking time may be specified, with a lower percentage resulting in more blanking segments than a higher percentage value. In some instances, a default may be set to 50% of the blanking time. In certain embodiments, the following may be used to determine a number of active frame segments to use:

$$\text{Num\_frames}=\text{int}(\text{predicted\_next\_frame}/(\text{active\_time}+\text{blank\_percent}*\text{blank\_time}))+1$$

where predicted_next_frame refers to the predicted next frame time (e.g., as described above), active_time refers to the amount of time for each active segment (which is fixed in Adaptive Sync), blank_percent refers to the percentage discussed above, and blank_time refers to the amount of blanking time in each frame).

Balance Correction—Balance and Direction

The correction required when the balance is positive and the next frame reduces the balance, or the balance is negative and the next frame increases the balance is identical. Hence, while the direction is required for counting the time, the correction algorithm can negate the balance whenever the direction is negative. This simplifies the cases to consider and allows the balance correction algorithm to always assume the first frame is adding balance. In certain embodiments, a modified balance amount may be used as follows:

$$\text{Modified\_balance}=\text{balance}*\text{direction}$$

where balance refers to the current overall balance, and direction refer to +1/−1 depending on the current direction of the balance change.

Balance Correction—Balance Adjustment

If the balance is within an allowed tolerance, then the display driver may not perform any correction techniques. However, if the balance strays outside this tolerance (e.g., exceeds a certain threshold), then some correction technique may be applied by the display driver to return to balance. In certain embodiments, the amount of correction applied may be based on the overall balance, e.g., how far the balance is outside the tolerance. There may be two values that control the amount of correction applied: (1) the guardband, and (2) the guardband_slope. These can both be adjusted for different desired behavior. In certain embodiments, the guardband and guardband_slope may be determined as follows:

$$\text{guardband}=1.5*\text{active\_time}$$

$$\text{guardband\_slope}=0.5*\text{active\_time}$$

$$\text{adjust}=\max(0,(\text{abs}(\text{current\_balance})-\text{guardband}))*\text{guardband\_slope}$$

where guardband refers to an amount of drift from zero/balance that is allowed before correction occurs, guardband_slope refers to a rate of change of the correction, and adjust refers to an amount of balance correction applied.

Balance Correction—Final Frame Adjustment

In certain embodiments, the spent in the last display frame may be determined based upon the predicted time and the number of frames that were chosen, and the final frame time may be adjusted by the adjustment calculated above. Whether to add or subtract the adjustment may depend on whether the current balance is positive or negative and whether the current total number of frames is even or odd. The rest of the time may be split equally between the earlier frames. In certain embodiments, the time spent in the last display frame may be determined as follows:

$$\text{final\_time}=\text{predicted}/\text{num\_frames}$$

if (modified_balance<0 && isOdd(num_frames))||
    (modified_balance>0 && isEven(num_frames))

final_time=final_time+adjust else final_time=final_time−adjust where final_time refers to the length of the last display frame. The final time value may be kept within the active or total time for the frame.

Balance Correction—Single Frame Corrections

If there is only a single frame to be displayed (as opposed to, e.g., the scenario described with respect to FIG. 3 where the Adaptive Sync protocol forces a second frame to be displayed), the balance cannot be adjusted by making earlier frames execute for less or more than the final frame. Instead, that extra time may be spent adjusting positively. This may introduce additional latency on alternate frames; however, it may be required to adjust the balance when the sequence of frames gets close to the maximum refresh rate of the screen.

if modified_balance <−guardband:

earliest_flip_time=final_time else final_time=max(final,predicted)

Balance Correction—Calculating VTOTAL

When there is more than one frame expected, the algorithm must know where to insert the additional ones. In such situations, the previously calculated final frame time may be subtracted, and the result may be divided by the number of earlier frames, as follows:

if num_frames>1 earlier_vtotal=(predicted−final)/(num_frames−1)

else earlier_vtotal=0

The final frame may be treated differently, as it may need to have a larger VTOTAL to allow for any inaccuracies in our predictions. VTOTAL refers to a maximum line the display will go to before starting a new active segment. However, there is an opportunity to reduce the amount of error that may be introduced by a very late frame—therefore, it may be smaller than the display's totals. In certain embodiments, the guardband_slope value from above may be used as the offset from predicted frame time, as follows:

if modified_balance>guardband:

final_vtotal=min(max(earlier_vtotal,final)+guardband_slope,vtotal)

Tables 1 and 2 below show the values used for particular frames, according to the example balance correction techniques described above.

TABLE 1

Earliest Flip Time for Different Frames of a Sequence

| | Frame 1 | Frame 2+ (if num_frames > 2) | Final Frame (if num_frames > 0) |
|---|---|---|---|
| Earliest Flip | earliest_flip_time | active_time | active_time |

TABLE 2

VTOTAL for Different Frames of a Sequence

| | Frame 1 (if num_frames > 0) | Frame 2+ (if num_frames > 2) | Final Frame |
|---|---|---|---|
| VTOTAL (line to insert a frame) | earlier_vtotal | earlier_vtotal | final_vtotal |

Referring to the example shown in FIG. 6, a case involving three or more segments may end up as:

TABLE 3

Example timing for multi-segment frames as in FIG. 6

| Frame | 1 | 2 | 3+ |
|---|---|---|---|
| Min | 7 ms | 7 ms | 7 ms |
| Max | 11.5 ms | 11.5 ms | 16 ms |

Referring to the example shown in FIG. 8, a single frame case would result in the two frames being defined as:

TABLE 4

Example timing for single-segment frames as in FIG. 8

| Frame | 1 (positive) | 2 (negative) |
|---|---|---|
| Min | 11.5 ms | 7.5 ms |
| Max | 15 ms | 14 ms |

One or more of the following processes may be used to track a current balance and determine a timing and execution of new frames for presentation on a display. The example processes may be implemented in software, firmware, hardware, or a combination thereof. In some embodiments, a computer-readable medium may be encoded with instructions (e.g., a computer program) that implement one or more of the operations in the example processes below. For example, in some embodiments, operations in the example processes shown in FIGS. 10, 11A-11B, and/or 12A-12B, may be performed by a display driver of a computer system (e.g., display driver 138 of FIG. 1). The example processes may include additional or different operations, and the operations may be performed in the order shown or in another order. In some cases, one or more of the operations shown in FIGS. 10, 11A-11B, and/or 12A-12B are implemented as processes that include multiple operations, sub-processes, or other types of routines. In some cases, operations can be combined, performed in another order, performed in parallel, iterated, or otherwise repeated or performed another manner.

Figure 10:
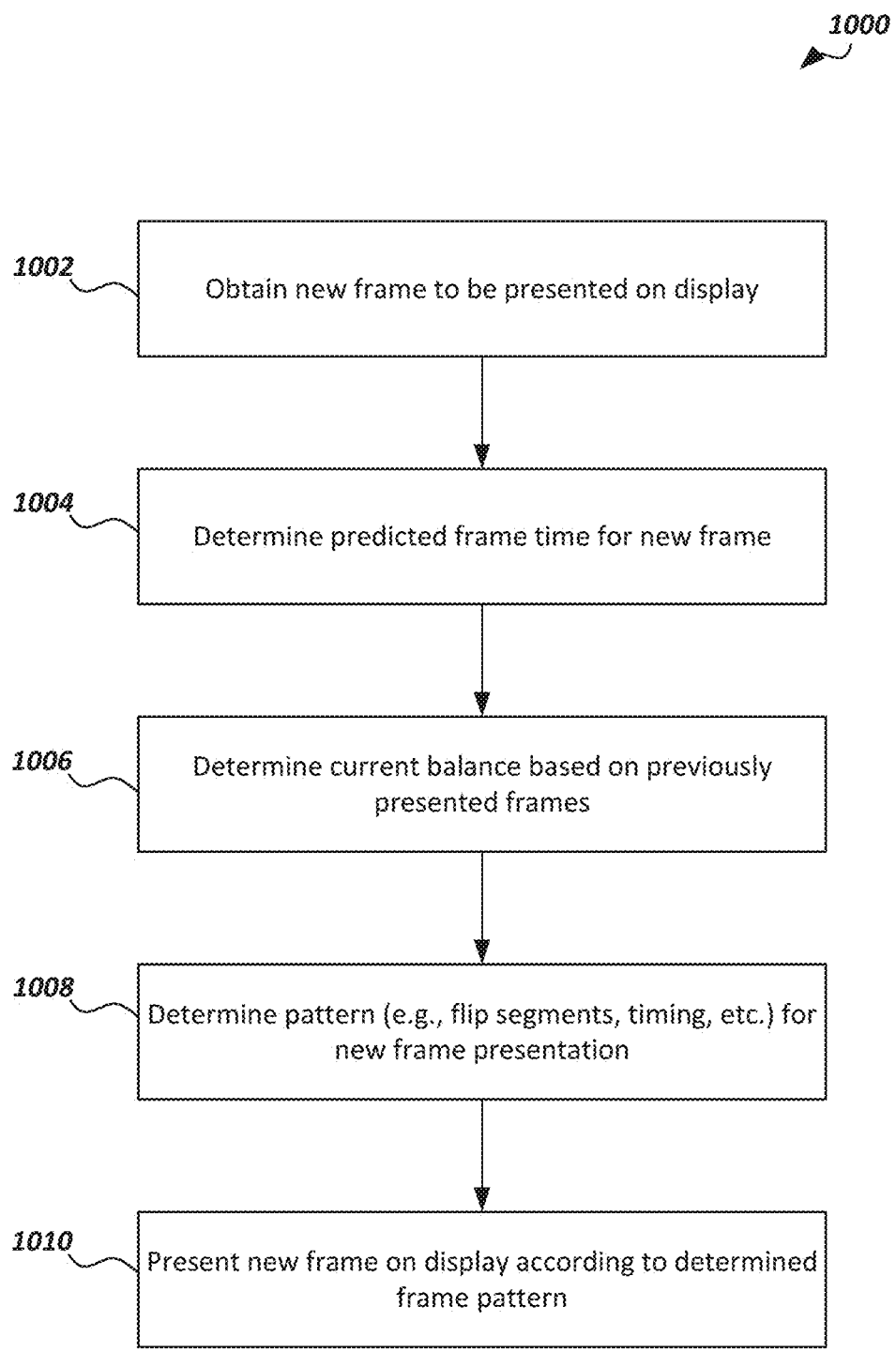
FIG. 10 is a flow diagram of an example process for determining a frame pattern based on a predicted frame time and current balance in accordance with embodiments of the present disclosure.

FIG. 10 is a flow diagram of an example process 1000 for determining a frame pattern based on a predicted frame time and current balance in accordance with embodiments of the present disclosure.

At 1002, a new frame is obtained by a display driver. The new frame may be generated by a program executing on a computing system (e.g., a computer game or other program/application on video source device 104), and may be provided to a display driver (e.g., display driver 138) so that it may be presented on a display connected to the computing system (e.g., display 102).

At 1004, a predicted frame time is determined by the display driver. In some instances, the predicted frame time may be based on an average of predicted frame times for one or more previous frames and actual frame times for the one or more previous frames (e.g., as described above). In certain instances, the average may be weighted. For example, the average may be weighted more heavily for more recently presented frames. The predicted frame time may be based on other factors as well.

At 1006, a current balance is determined by the display driver based on a set of previously presented frames. The balance may be a polarity balance that estimates an overall balance between the odd/even or positive/negative frames that have previously been presented on the display. The balance may be determined based on an execution time for each of the previously presented frames, a number of scanlines for each of the previously presented frames, or both. For example, the balance may be determined based on the difference between an amount of time/number of scanlines for frames presented using positive voltage polarities and an amount of time/number of scanlines for frames presented using negative voltage polarities. In some cases, one or more counters may be used to determine the balance, e.g., as described below. The balance may indicate a relative potential for charge build-up in electrical components of a display as described above.

Figure 5:
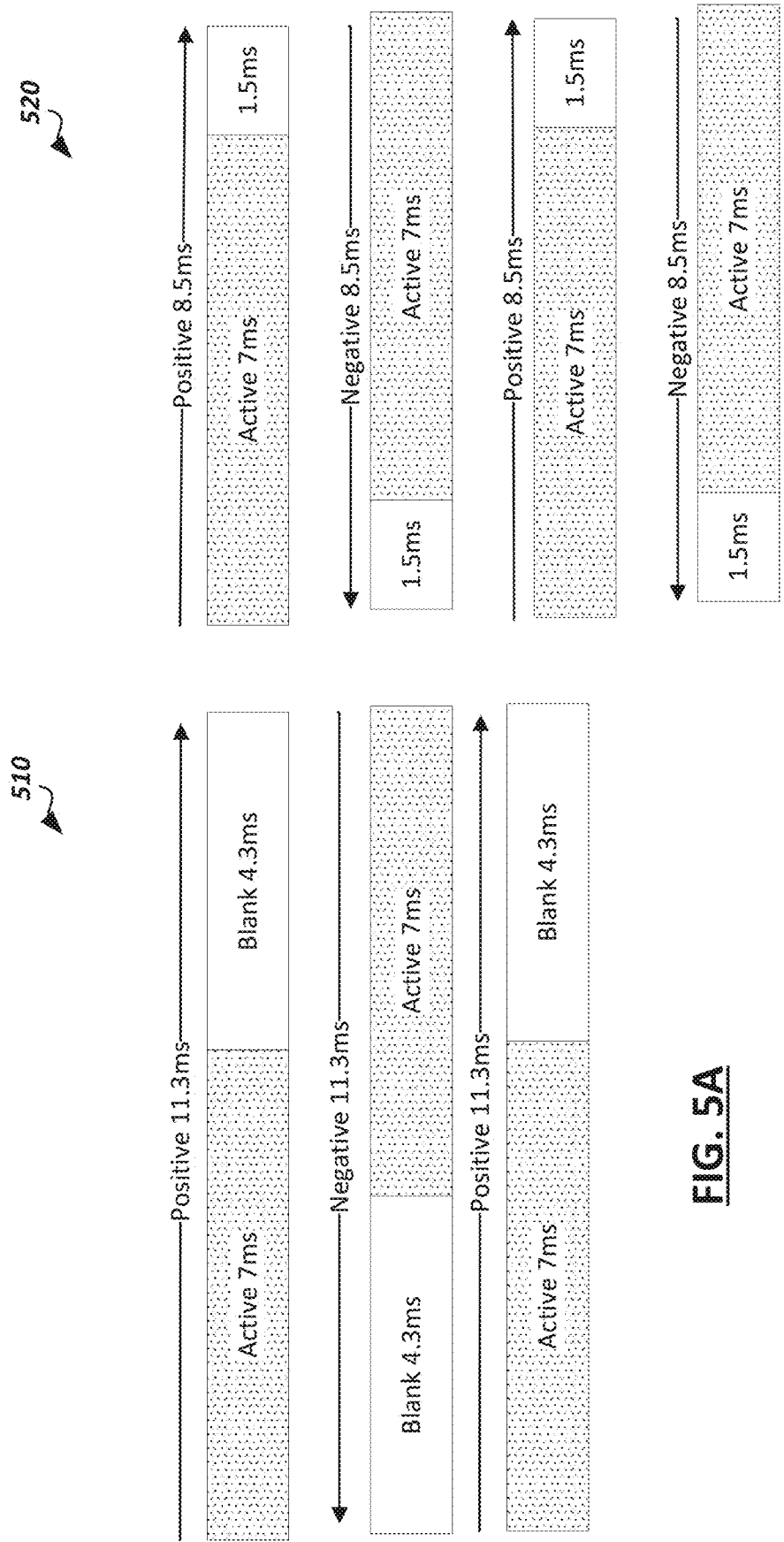
FIGS. 5A-5B illustrate other example VRR scenarios in which a balance is monitored by a display driver in accordance with embodiments of the present disclosure.

At 1008, the display driver determines a frame pattern for the new frame based on the predicted frame time determined at 1004 and the current balance determined at 1006. In some instances, the frame pattern may include a sequence segments (e.g., the positive and negative flip segments described above with respect to FIGS. 3-8). The segments may be of alternating polarity, with each segment having an active portion and a blank portion. In some cases, the length of the active portion may be determined based on a specification (e.g., 7 ms for an Adaptive Sync specification). In certain cases, each segment may be of equal length, e.g., as shown in FIGS. 4, 5A-5B. In other cases, the segments may have different lengths. For instance, the segments may be formatted similar to those shown in FIGS. 7A-7B, where all segments are equal in length except the last segment, which may be longer or shorter than the other segments. In some cases, the number of segments in the frame pattern is based on a parameter indicating an amount of blanking time for the frame (e.g., the blank_percent parameter as described above). In some cases, the frame pattern may include a single segment. In such instances, the frame pattern may include additional time (such that subsequent frames are deferred) when the single segment is of opposite polarity from the current balance determined at 1006 (e.g., as described above with respect to FIG. 8). Further, in some cases, the new frame may be deferred from being presented if a currently presented frame is achieving more balance/moving the balance closer to zero.

At 1010, the new frame is presented on the display according to the frame pattern determined at 1008. For example, the display driver may cause a GPU to provide signals to the display that drive the display according to the frame pattern.

Figure 11B:
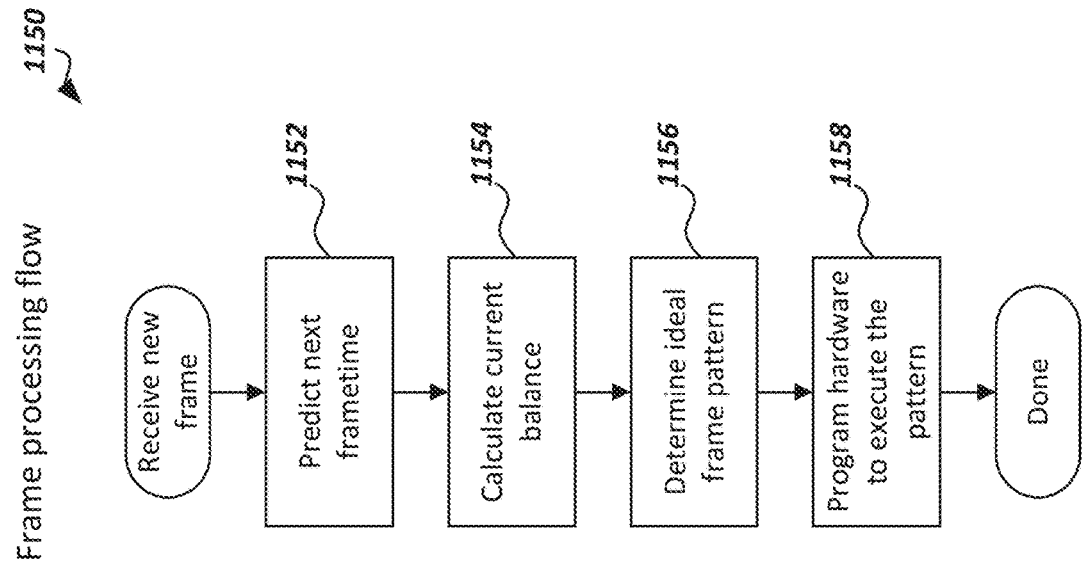
FIGS. 11A-11B are flow diagrams of example processes for tracking an overall charge balance and processing frames in accordance with embodiments of the present disclosure.
Figure 11A:
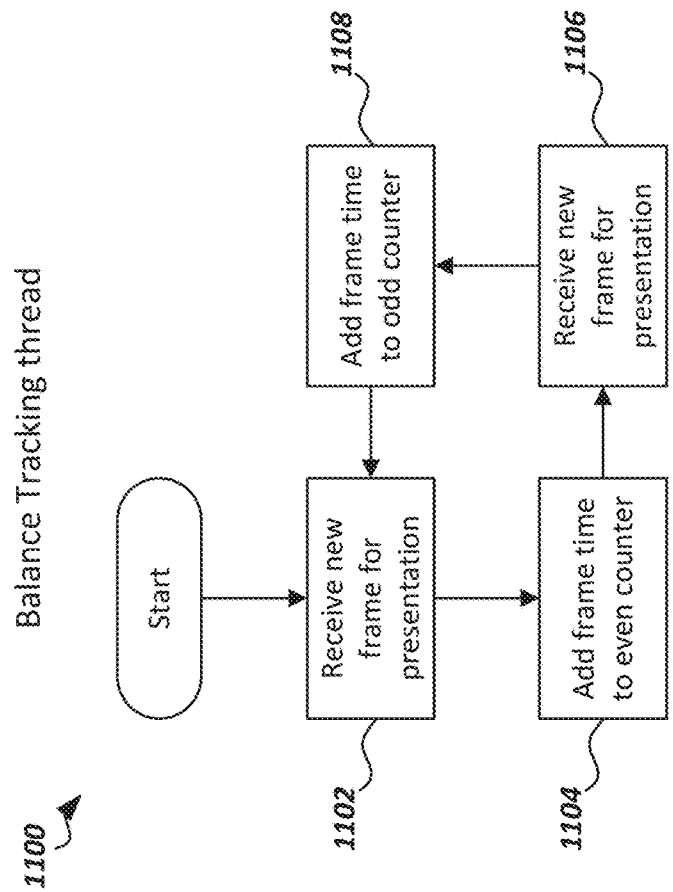

FIGS. 11A-11B are flow diagrams of example processes 1100, 1150 for tracking an overall charge balance and processing frames in accordance with embodiments of the present disclosure. In particular, FIG. 11A shows a balance tracking thread process 1100 and FIG. 11B shows a frame processing thread process 1150. The two processes 1100, 1150 may be executed by a display driver concurrently in certain instances.

In the example process 1100 shown in FIG. 11A, every time a new frame is started (e.g., via a Vsync signal, at 1102, 1106) the number of scanlines or time in the previously displayed frame is added to the appropriate odd/even frame counters (e.g., at 1104, 1108). The counters may be maintained as separate counters in some embodiments, while in other embodiments, a single counter may be maintained, e.g., as a delta between odd and even counts.

In the example process 1150 shown in FIG. 11B, after a flip (i.e., a new frame for presentation) is received from the operating system, a next frame time is predicted at 1152. The predicted frame time may be used to calculate the pattern of flips to maintain an overall charge balance. At 1154, a current balance is calculated, taking into account the currently executing frame. At 1156, an ideal frame pattern is determined based on the current balance and the predicted frame time. Determining the ideal frame pattern may include determining a number of flips that will maintain balance or move the current balance toward equal/zero. At 1158, hardware (e.g., display engine) is programmed to execute the determined pattern. The hardware programming can occur either via explicit functionality in the hardware or via a software mechanism that triggers new frames at the desired times.

FIGS. 12A-12B are flow diagrams of additional example processes 1200, 1250 for tracking an overall charge balance and processing frames in accordance with embodiments of the present disclosure. In particular, FIG. 12A shows a balance tracking thread process 1200 and FIG. 12B shows a frame processing thread process 1250. The two processes 1200, 1250 may be executed by a display driver concurrently in certain instances. In the examples shown, as compared with the examples shown in FIGS. 11A-11B, the frame processing occurs in the balance tracking thread. The act of triggering a flip in the frame processing flow may result in a Vsync signal, which causes the balance tracking thread to accurately update its counters for the prior frame. This has the advantage that the current balance is more accurate, but the implementation may adjust the execution pattern for the flip that was already triggered.

More particularly, at 1202, a new frame is received for presentation on a display, and at 1204, the frame time is added to an even counter. At 1206, the display driver determines whether a flip has occurred. If so, at 1208, an ideal frame pattern is calculated and at 1210, display hardware (e.g., display engine) is programmed to execute the determined pattern. The hardware programming can occur either via explicit functionality in the hardware or via a software mechanism that triggers new frames at the desired times. If no flip occurs, then the process moves to 1212.

At 1212, a new frame is received for presentation on the display, and at 1214, the frame time is added to an odd counter. At 1216, the display driver determines whether a flip has occurred. If so, at 1218, an ideal frame pattern is calculated and at 1220, the display hardware (e.g., display engine) is programmed to execute the determined pattern. The hardware programming can occur either via explicit functionality in the hardware or via a software mechanism that triggers new frames at the desired times. If no flip occurs, then the process moves back to 1202.

Figure 13:
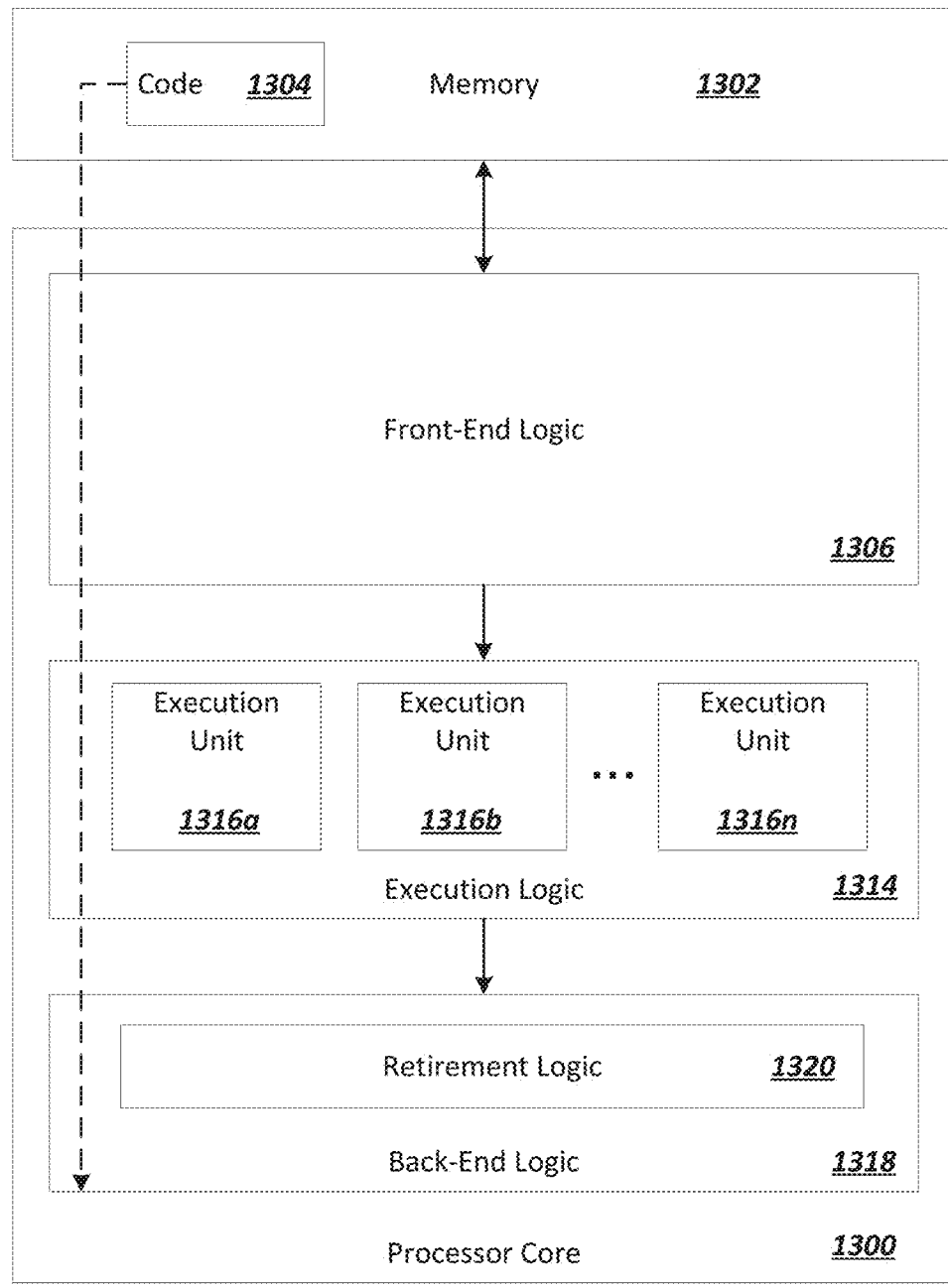
FIG. 13 is an example illustration of a processor according to an embodiment.
Figure 14:
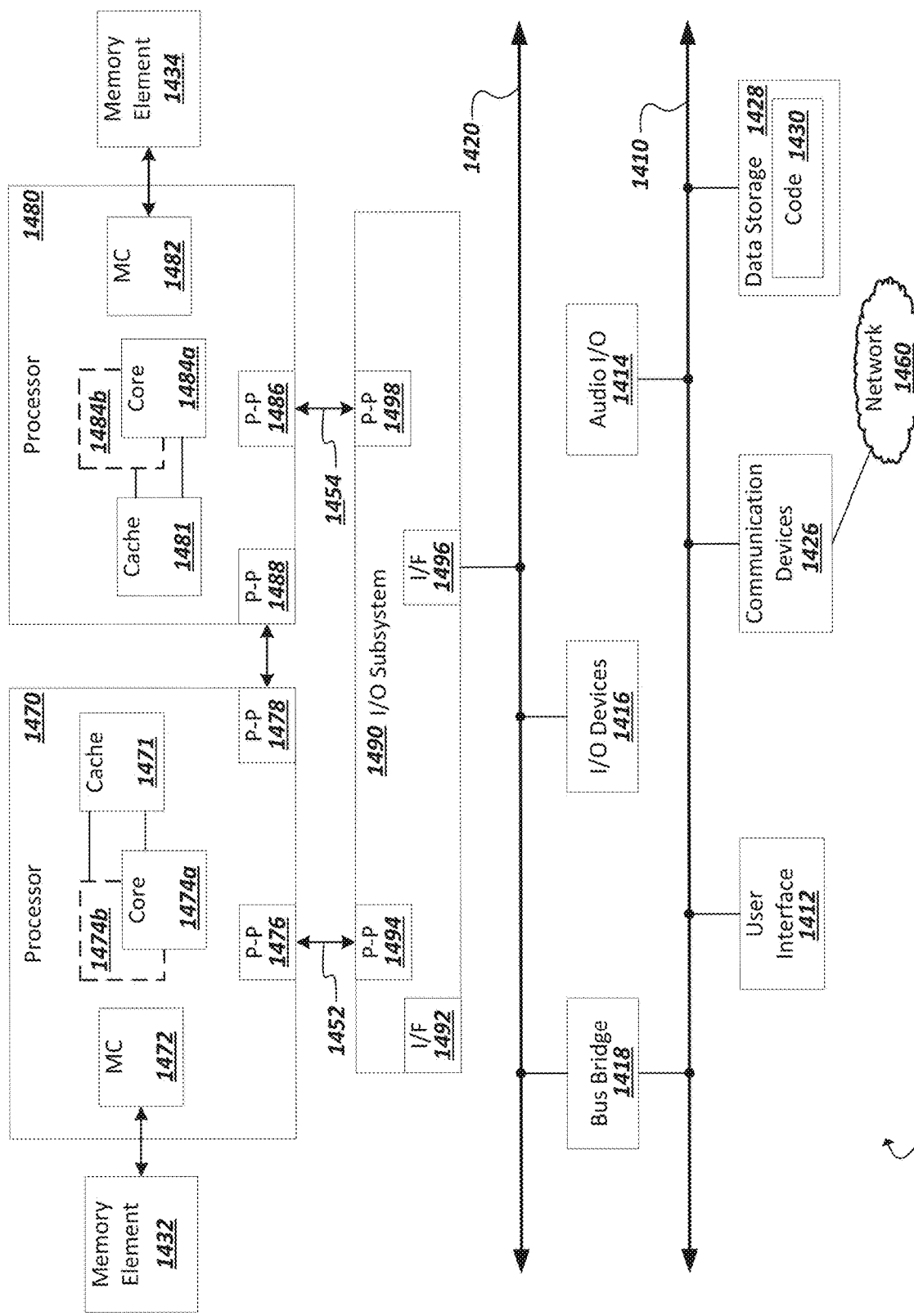
FIG. 14 illustrates a computing system that is arranged in a point-to-point (PtP) configuration according to an embodiment.

FIGS. 13-14 are block diagrams of example computer architectures that may be used in accordance with embodiments disclosed herein. For example, in some embodiments, a computer system (e.g., a computer system 100) may contain one or more aspects shown in FIGS. 13-14 (e.g., video source device 104 may be implemented with one or more components shown in FIGS. 13 and 14) and may implement one or more aspects of the present disclosure. Other computer architecture designs known in the art for processors and computing systems may also be used. Generally, suitable computer architectures for embodiments disclosed herein can include, but are not limited to, configurations illustrated in FIGS. 13-14.

FIG. 13 is an example illustration of a processor according to an embodiment. Processor 1300 is an example of a type of hardware device that can be used in connection with the implementations above. Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with an embodiment. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor 1300 can also include execution logic 1314 having a set of execution units 1316a, 1316b, 1316n, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems described herein may be configured in the same or similar manner as computing system 1300.

Processors 1470 and 1480 may also each include integrated memory controller logic (MC) 1472 and 1482 to communicate with memory elements 1432 and 1434. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with a chipset 1490 via individual point-to-point interfaces 1452 and 1454 using point-to-point interface circuits 1476, 1486, 1494, and 1498. Chipset 1490 may also exchange data with a co-processor 1438, such as a high-performance graphics circuit, machine learning accelerator, or other co-processor 1438, via an interface 1439, which could be a PtP interface circuit. In alternative embodiments, any or all of the PtP links illustrated in FIG. 14 could be implemented as a multi-drop bus rather than a PtP link.

Chipset 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a user interface 1412 (such as a keyboard, mouse, touchscreen, or other input devices), communication devices 1426 (such as modems, network interface devices, or other types of communication devices that may communicate through a computer network 1460), audio I/O devices 1416, and/or a data storage device 1428. Data storage device 1428 may store code 1430, which may be executed by processors 1470 and/or 1480. In alternative embodiments, any portions of the bus architectures could be implemented with one or more PtP links.

The computer system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes one or more computer-readable media comprising instructions that, when executed by a machine, cause the machine to: determine a predicted frame time for a new frame to be presented on a display; determine a current balance based on a set of previously presented frames; determine a frame pattern for the new frame based on the predicted frame time and the current balance; and cause the new frame to be presented on the display based on the determined frame pattern.

Example 2 includes the subject matter of Example 1 and/or other Example(s), and optionally, wherein the instructions are to determine a frame pattern that comprises a sequence of segments, each segment comprising an active portion and a blank portion, wherein the segments alternate polarity in the sequence.

Example 3 includes the subject matter of Example 2 and/or other Example(s), and optionally, wherein each segment is equal in length.

Example 4 includes the subject matter of Example 2 and/or other Example(s), and optionally, wherein a last segment is longer than other segments.

Example 5 includes the subject matter of Example 2 and/or other Example(s), and optionally, wherein a last segment being shorter than other segments.

Example 6 includes the subject matter of Example 2 and/or other Example(s), and optionally, wherein the number of segments is based on a parameter indicating an amount of blanking time for the new frame.

Example 7 includes the subject matter of any one of Examples 1-6 and/or other Example(s), and optionally, wherein the instructions are to defer presentation of the new frame based on the current balance being opposite in polarity from a frame currently being presented on the display.

Example 8 includes the subject matter of any one of Examples 1-7 and/or other Example(s), and optionally, wherein the instructions are to determine the predicted frame time based on an average of predicted frame times for one or more previous frames and actual frame times for the one or more previous frames.

Example 9 includes the subject matter of any one of Examples 1-8 and/or other Example(s), and optionally, wherein the instructions are to determine the current balance based on one or more of an execution time for each of the previously presented frames and a number of scanlines for each of the previously presented frames.

Example 10 includes the subject matter of any one of Examples 1-9 and/or other Example(s), and optionally, wherein the instructions are to determine a frame pattern to reduce an absolute value of the current balance.

Example 11 includes the subject matter of Example 10 and/or other Example(s), and optionally, wherein the determined frame pattern is based on the current balance being outside a range of tolerance.

Example 12 includes the subject matter of any one of Examples 1-11 and/or other Example(s), and optionally, wherein the instructions are to determine a frame pattern to maintain the current balance.

Example 13 includes the subject matter of Example 12 and/or other Example(s), and optionally, wherein the determined frame pattern is based on the current balance being inside a range of tolerance.

Example 14 includes a method comprising: obtaining a new frame for presentation on a display; determining a predicted frame time for the new frame; determining a current balance based on a set of previously presented frames; and presenting the new frame on the display according to a frame pattern that is based on the predicted frame time and the current balance.

Example 15 includes the subject matter of Example 14 and/or other Example(s), and optionally, wherein the frame pattern comprises a sequence of segments, each segment comprising an active portion and a blank portion, wherein the segments alternate polarity in the sequence.

Example 16 includes the subject matter of Example 15 and/or other Example(s), and optionally, wherein each segment is equal in length.

Example 17 includes the subject matter of Example 15 and/or other Example(s), and optionally, wherein a last segment is longer than other segments.

Example 18 includes the subject matter of Example 15 and/or other Example(s), and optionally, wherein a last segment being shorter than other segments.

Example 19 includes the subject matter of Example 15 and/or other Example(s), and optionally, wherein the number of segments is based on a parameter indicating an amount of blanking time for the new frame.

Example 20 includes the subject matter of any one of Examples 14-19 and/or other Example(s), and optionally, wherein presenting the new frame comprises deferring presentation of the new frame based on the current balance being opposite in polarity from a frame currently being presented on the display.

Example 21 includes the subject matter of any one of Examples 14-20 and/or other Example(s), and optionally, wherein the predicted frame time is determined based on an average of predicted frame times for one or more previous frames and actual frame times for the one or more previous frames Example 22 includes the subject matter of any one of Examples 14-21 and/or other Example(s), and optionally, wherein the current balance is determined based on one or more of an execution time for each of the previously presented frames and a number of scanlines for each of the previously presented frames.

Example 23 includes the subject matter of any one of Examples 14-22 and/or other Example(s), and optionally, wherein the instructions are to determine a frame pattern to reduce an absolute value of the current balance.

Example 24 includes the subject matter of Example 23 and/or other Example(s), and optionally, wherein the determined frame pattern is based on the current balance being outside a range of tolerance.

Example 25 includes the subject matter of any one of Examples 14-19 and/or other Example(s), and optionally, wherein the instructions are to determine a frame pattern to maintain the current balance.

Example 26 includes the subject matter of Example 25 and/or other Example(s), and optionally, wherein the determined frame pattern is based on the current balance being inside a range of tolerance.

Example 27 includes a system comprising: a processor to generate and communicate video signals to a display; and memory comprising instructions to control the processor in generating the video signals, the instructions to cause the processor to perform operations comprising: determining a predicted frame time for a new frame to be presented on the display; determining a current balance based on a set of previously presented frames; determining a frame pattern for the new frame based on the predicted frame time and the current balance.

Example 28 includes the subject matter of Example 27 and/or other Example(s), and optionally, wherein the instructions are to determine a sequence of frame segments, each frame segment comprising an active portion and a blank portion, wherein the segments alternate polarity in the sequence.

Example 29 includes the subject matter of Example 28 and/or other Example(s), and optionally, wherein each segment is equal in length.

Example 30 includes the subject matter of Example 28 and/or other Example(s), and optionally, wherein a last segment is longer than other segments.

Example 31 includes the subject matter of Example 28 and/or other Example(s), and optionally, wherein a last segment being shorter than other segments.

Example 32 includes the subject matter of Example 28 and/or other Example(s), and optionally, wherein the number of segments is based on a parameter indicating an amount of blanking time for the new frame.

Example 33 includes the subject matter of any one of Examples 27-32 and/or other Example(s), and optionally, wherein the instructions are to defer presentation of the new frame based on the current balance being opposite in polarity from a frame currently being presented on the display.

Example 34 includes the subject matter of any one of Examples 27-33 and/or other Example(s), and optionally, wherein the instructions are to determine the predicted frame time based on an average of predicted frame times for one or more previous frames and actual frame times for the one or more previous frames.

Example 35 includes the subject matter of any one of Examples 27-34 and/or other Example(s), and optionally, wherein the instructions are to determine the current balance based on one or more of an execution time for each of the previously presented frames and a number of scanlines for each of the previously presented frames.

Example 36 includes the subject matter of any one of Examples 27-35 and/or other Example(s), and optionally, wherein the instructions are to determine a frame pattern to reduce an absolute value of the current balance.

Example 37 includes the subject matter of any one of Example 36 and/or other Example(s), and optionally, wherein the determined frame pattern is based on the current balance being outside a range of tolerance.

Example 38 includes the subject matter of any one of Examples 27-37 and/or other Example(s), and optionally, wherein the instructions are to determine a frame pattern to maintain the current balance.

Example 39 includes the subject matter of any one of Example 38 and/or other Example(s), and optionally, wherein the determined frame pattern is based on the current balance being inside a range of tolerance.

Example 40 includes the subject matter of any one of Examples 27-39 and/or other Example(s), and optionally, further comprising a variable refresh rate (VRR)-capable display coupled to the processor.

Example 41 includes the subject matter of any one of Examples 27-40 and/or other Example(s), and optionally, wherein the processor comprises a graphics processing unit (GPU).

Example 42 includes a system comprising: means for determining a frame pattern for a new frame to be presented on a display based on a predicted frame time for the new frame and a current balance for a set of previously presented frames.

Example 43 includes the subject matter of Example 42 and/or other Example(s), and optionally, wherein the means for determining the frame pattern comprise a graphics processing unit (GPU).

Example 44 includes the subject matter of Example 42 and/or other Example(s), and optionally, further comprising means for presenting the new frame on the display according to the determined frame pattern.

Example 45 includes an apparatus or system to implement any method as disclosed herein.

Example 46 includes one or more computer-readable media comprising instructions that, when executed by a machine, cause the machine to implement any method as disclosed herein.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. One or more non-transitory computer-readable media comprising instructions that, when executed by a machine, cause the machine to:
   determine a predicted frame time for a new frame to be presented on a display;
   determine a current balance for a set of previously presented frames;
   determine a frame pattern for the new frame based on the predicted frame time and the current balance; and
   cause the new frame to be presented on the display based on the determined frame pattern,
   wherein presentation of the new frame is deferred based on the current balance being opposite in polarity from a frame currently being presented on the display, and
   wherein the instructions are to determine the predicted frame time based on an average of predicted frame times for one or more previous frames and actual frame times for the one or more previous frames.

2. The non-transitory computer-readable media of claim 1, wherein the instructions are to determine a frame pattern that comprises a sequence of segments, each segment comprising an active portion and a blank portion, wherein the segments alternate polarity in the sequence.

3. The non-transitory computer-readable media of claim 2, wherein each segment is equal in length.

4. The non-transitory computer-readable media of claim 2, wherein a last segment is longer than other segments.

5. The non-transitory computer-readable media of claim 2, wherein a last segment is shorter than other segments.

6. The non-transitory computer-readable media of claim 2, wherein the number of segments is based on a parameter indicating an amount of blanking time for the new frame.

7. The non-transitory computer-readable media of claim 1, wherein the instructions are to determine the current balance based on one or more of an execution time for each of the previously presented frames and a number of scanlines for each of the previously presented frames.

8. The non-transitory computer-readable media of claim 1, wherein the instructions are to determine a frame pattern to reduce an absolute value of the current balance.

9. The non-transitory computer-readable media of claim 8, wherein the determined frame pattern is based on the current balance being outside a range of tolerance.

10. The non-transitory computer-readable media of claim 1, wherein the instructions are to determine a frame pattern to maintain the current balance.

11. The non-transitory computer-readable media of claim 10, wherein the determined frame pattern is based on the current balance being inside a range of tolerance.

12. A method comprising:
    obtaining a new frame for presentation on a display;
    determining a predicted frame time for the new frame;
    determining a current balance for a set of previously presented frames; and
    presenting the new frame on the display according to a frame pattern that is based on the predicted frame time and the current balance,
    wherein presentation of the new frame is deferred based on the current balance being opposite in polarity from a frame currently being presented on the display, and
    wherein the predicted frame time is determined based on an average of predicted frame times for one or more previous frames and actual frame times for the one or more previous frames.

13. The method of claim 12, wherein the frame pattern comprises a sequence of segments, each segment comprising an active portion and a blank portion, wherein the segments alternate polarity in the sequence.

14. The method of claim 12, wherein the current balance is determined based on one or more of an execution time for each of the previously presented frames and a number of scanlines for each of the previously presented frames.

15. A system comprising:
    a processor to generate and communicate video signals to a display; and
    memory comprising instructions to control the processor in generating the video signals, the instructions to cause the processor to:
    determine a predicted frame time for a new frame to be presented on the display;
    determine a current balance for a set of previously presented frames;
    determine a frame pattern for the new frame based on the predicted frame time and the current balance; and
    cause presentation of the new frame to be deferred based on the current balance being opposite in polarity from a frame currently being presented on the display,
    wherein the instructions are to determine the predicted frame time based on an average of predicted frame times for one or more previous frames and actual frame times for the one or more previous frames.

16. The system of claim 15, wherein the instructions are to determine a sequence of frame segments, each frame segment comprising an active portion and a blank portion, wherein the frame segments alternate polarity in the sequence.

17. The system of claim 15, wherein the instructions are to determine the frame pattern to reduce an absolute value of the current balance.

18. The system of claim 15, wherein the instructions are to determine the frame pattern to maintain the current balance.

19. The system of claim 15, further comprising a variable refresh rate (VRR)-capable display coupled to the processor.

20. The system of claim 15, wherein the processor comprises a graphics processing unit (GPU).

* * * * *